Sept. 1, 1931.   H. M. LE FEVER   1,820,981
APPARATUS FOR CONTROLLING LIQUID LEVELS
Filed March 7, 1928   3 Sheets-Sheet 1

WITNESSES:
Alfred E. Tschinger.
Evelyn Crompton

INVENTOR:
Harry M. LeFever,
BY
Joshua R. H. Potts
ATTORNEY

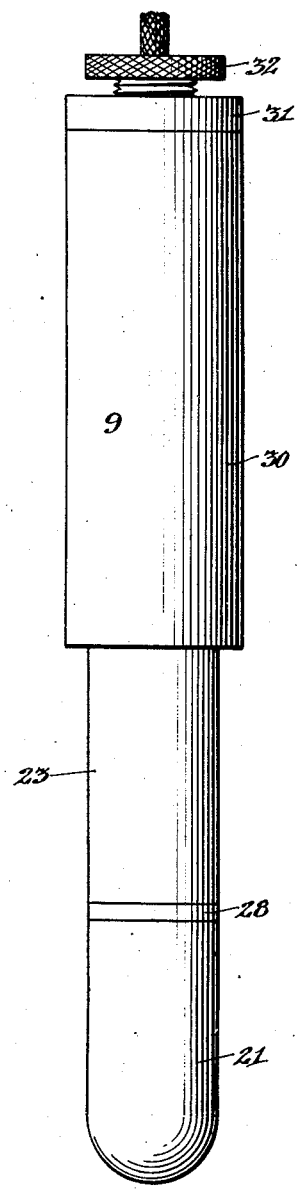
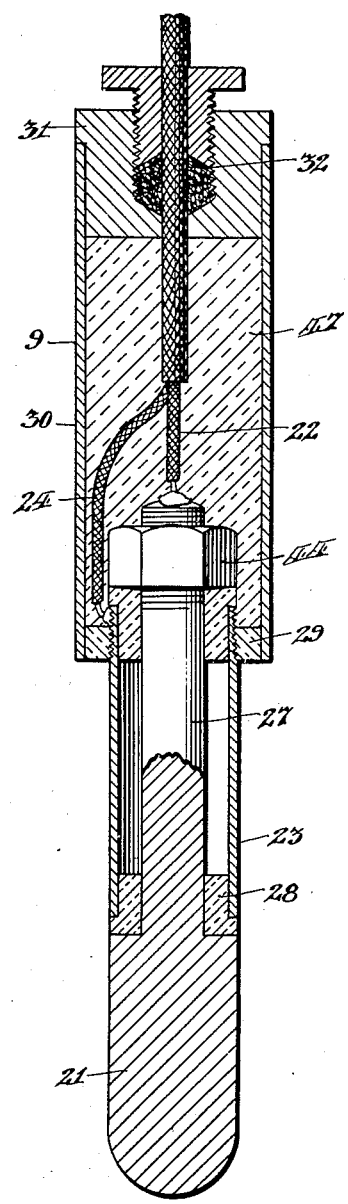

Sept. 1, 1931.   H. M. LE FEVER   1,820,981
APPARATUS FOR CONTROLLING LIQUID LEVELS
Filed March 7, 1928   3 Sheets-Sheet 3

WITNESSES:
Alfred E. Oschinger
Evelyn Crompton

INVENTOR:
Harry M. LeFever,
BY
Joshua R. H. Potts
ATTORNEY

Patented Sept. 1, 1931

1,820,981

UNITED STATES PATENT OFFICE

HARRY M. LE FEVER, OF PHILADELPHIA, PENNSYLVANIA

APPARATUS FOR CONTROLLING LIQUID LEVELS

Application filed March 7, 1928. Serial No. 259,892.

My invention relates to liquid level controlling systems and particularly to an electric one.

One object of my invention is to provide an automatic liquid level controlling system in which the liquid itself is used as a conductor, and forms part of the electric circuit.

Another object is to provide such a system in which the liquid level is allowed to reach a predetermined point and is then automatically drawn off until its level reaches a lower fixed point.

Still another feature is the provision and combination of apparatus in such a system, which makes it highly efficient in operation.

An object of the invention is to provide an electrical control for the operation of mechanism, automatically operable under the influence of the extension of material lineraly to a given point, and which maintains said operation until the extension of the material has decreased to a given position short of said point.

The apparatus is particularly applicable for operation of a pump or valve whereby fluid may be drawn off from a tank.

The objects above pointed out and the attendant advantages will become more readily apparent from the detailed description of an embodiment of my invention, which follows, reference being had to the accompanying drawings, in which like reference numerals designate similar parts.

Referring to the drawings:

Fig. 2 is an elevational view of an electrode.

Fig. 3 is a central longitudinal sectional view, partly in full, of the electrode shown in Fig. 2.

The liquid level control system of my invention is applicable wherever the liquid in a reservoir is to be kept below a certain predetermined point, and where the liquid is a conductor of electricity and non-inflammable.

For the purpose of illustration, as to the manner in which it works, I will describe its operation as applied to the milk cooling apparatus of a dairy, in which the milk, after being pasteurized, is run over cooling pipes and into a reservoir or collecting pan. In order to prevent the milk in the reservoir from running over, it is necessary to periodically pump the milk therefrom into a storage tank.

When my system of liquid level control is applied to such a reservoir, it will prevent the milk from rising above a certain predetermined level, and when it has reached this level, the pump motor is automatically turned on and a certain amount of the milk pumped into the storage tank.

Figure 1:
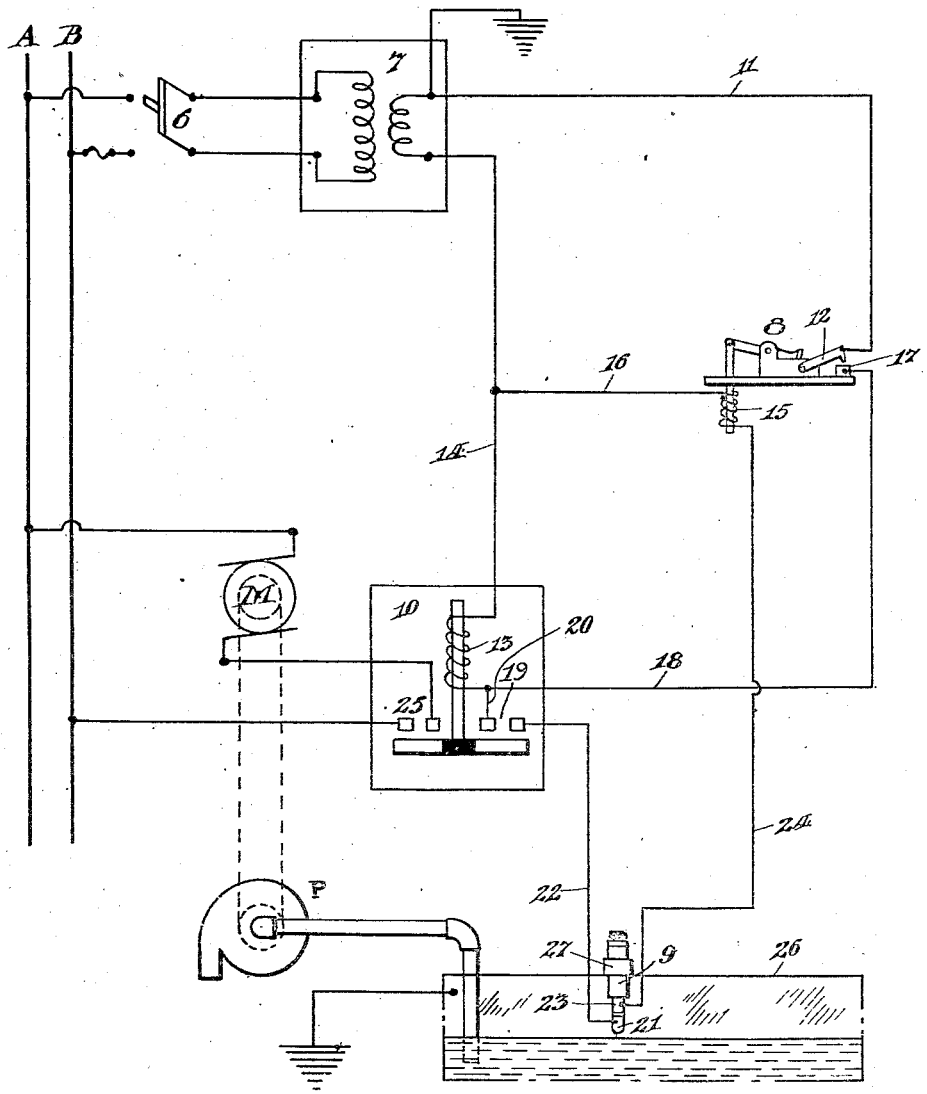
Fig. 1 is a schematic wiring diagram of my automatic liquid level controlling system.

The liquid level controlling system of my invention, an embodiment of which I have illustrated in Fig. 1, comprises a main switch 6, a transformer 7, an automatic mercury switch 8, a bi-polar electrode 9, an automatic double circuit switch 10, and a motor M. The automatic mercury switch 8 and the electrode 9 are of special construction and will be described later. The primary winding of the transformer 7 is connected through the main switch 6, to a source of electric energy represented by the lines A—B. One terminal of the secondary winding of the transformer 7 is grounded, and connected by the conductor 11 with the contact arm 12 of the automatic mercury switch 8. The other terminal of the secondary transformer winding is connected to the coil 13 of the switch 10 by the conductor 14, also to the coil 15 of the mercury switch 8, by a conductor 16. The coil 13 is connected to the mercury cup 17 of the switch 8 by a conductor 18 and one switch point of the switch 19 is connected to the conductor 20. The second switch point of the switch 19 is connected to the terminal 21 of the electrode 9 by the conductor 22, while the terminal 23 of the electrode 9 is connected to the coil 15 by a conductor 24. The terminals of the electrode are insulated from one another. The motor M is connected to the source of power A—B, through a switch 25. The switches 25 and 19 are simultaneously closed or opened when the coil 13 is energized or deenergized. The motor M drives the pump P which pumps the milk from the reservoir, or collecting pan 26. If the reservoir 26 is of metal, it is grounded and constitutes one electrode of a circuit. If made of non-conducting material, an electrode is placed in its bottom and this bi-polar electrode grounded. The electrode 9 is mounted in the reservoir 26 by a sanitary clamp 27, and determines the point to which the milk may rise and is therefore located accordingly.

By referring now to Figs. 2 and 3, which illustrate the construction of the electrode 9, it will be noted that the metallic terminal 21 has a reduced extension 27 which passes through the insulating bushings 28 and 29 and the metallic terminal 23, which is in the form of a tube threaded at one ned. The extension 27 is threaded at its upper end, and has a nut 44 mounted thereon which serves as a retaining means. The terminal sleeve 23 is threaded into the insulating collar 29 which is forced into the metal sleeve 30, the upper end of which is closed by a metal plug 31 which is forced thereon, and has a stuffing box 32 mounted therein. A wire 22 is soldered to the extension 27 of the terminal 21, and a wire 24 is soldered to the upper end of the terminal sleeve 23. These wires pass up through the sleeve 30 and out through the stuffing box 31. The inside of the sleeve 30 is filled with an insulating sealing compound, as indicated at 47.

Figure 4:
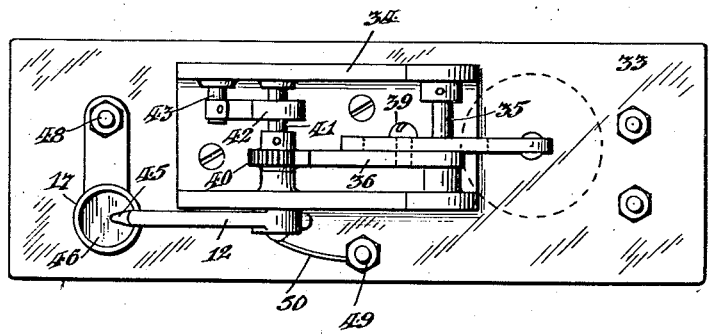
Fig. 4 is a plan view of an automatic mercury switch.
Figure 5:
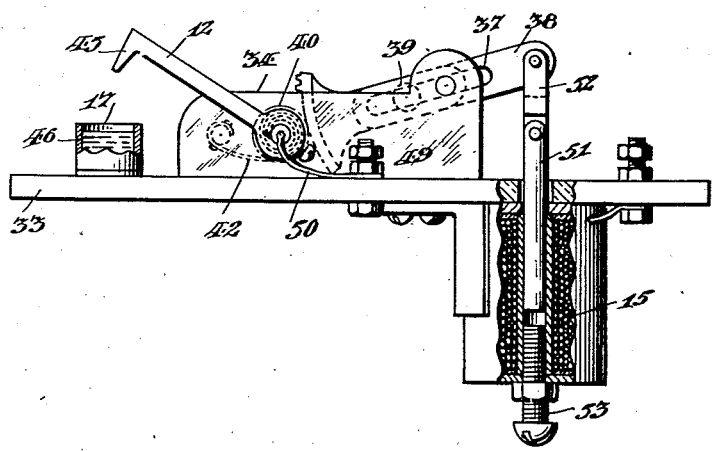
Fig. 5 is a side view, partly broken away, of the mercury switch shown in Fig. 4.

The automatic mercury switch 8, shown in detail in Figs. 4 and 5, comprises a non-metallic base plate 33 to which is secured a mounting 34 of insulating material. A rod 35 extends through the sides of the mounting 34 and through the rear end of an arm 36 having a gear segment at its other end. The rod 35 also passes through the slot 37 of an extension plate 38 which is secured to the arm 36 by a screw 39. The gear segment meshes with a pinion 40 of insulating material, which is fixed on a shaft 41. One end of a coiled spring 42 is secured to the shaft 41 and its other end is secured to a stud 43 fixed in the mounting 34. A contact arm 12 is mounted at one end of the shaft 41 which has a pointed end 45 adapted to dip into the mercury 46 in the cup 17. The cup 17 is provided with a connecting terminal 48 while a terminal 49 is connected with the contact arm 12 by a wire 50. The solenoid 15 is secured to the base plate 33 and has an armature 51 which is connected to the extension plate 38 by a link 52. A stop screw 53, threaded into the casing of the coil 15, limits the movement of the armature 51 and serves as an adjustment to vary its length of pull. The slotted extension plate 38 serves as an adjustment for the movement of the gear segment on the arm 36. The coiled spring 42 raises the contact arm 12 to the position shown. When the coil 15 is energized, the armature is pulled therein, thereby moving the gear segment to rotate gear 40 against the tension of spring 42 which moves the point 45 of the contact arm 12 into the mercury 46.

The system operates in the following manner. When the main switch 6 is closed and the milk rises to the terminal 23 of the electrode 9, a closed circuit is formed through the secondary of the transformer 7, the conductors 14 and 16, the coil 15, the electrode terminal 23 through the milk to the ground, and from the ground back to the secondary of the transformer 7. The coil 15 being energized, causes the point 45 of the contact arm 12 to dip into the mercury 46, thereby establishing another circuit, and current flows through the conductor 14, the coil 13, the conductor 18, the mercury cup 17, the contact arm 12, the conductor 11, and the secondary of the transformer.

When current flows through the coil 13, it attracts its armature which closes the switches 19 and 25, thus connecting the motor M to the line. This motor drives the pump P so that the milk will be pumped from the reservoir. Of course, if the reservoir is located at a higher point than the storage tank, it would merely be necessary to open and close a valve instead of operating the motor and in that case, an automatic valve operating switch could be substituted for the motor.

The switch 19 being closed, establishes a circuit through the secondary of the transformer conductors 14, the coil 13, the switch 19, the electrode terminal 21, through the milk to the ground, and from the ground back to the secondary of the transformer 7.

It will thus be noted that circuits controlling the motor circuit will remain closed until sufficient milk has been pumped from the reservoir, or until the milk level drops below the electrode terminal 21, at which level all the circuits will be open, except, of course, the primary transformer circuit controlled by the main switch.

It will thus be apparent that the interval provided by the exposed length of the electrode 21 will govern the variation of liquid level. When the liquid rises into the contact with the electrode 23, the operation of the pump through the medium of the motor M is begun and continued after the liquid level has receded below said electrode 23 for the reason that the circuit through the electrode 21 and the switch 19 will energize the coil 13 and therefore, maintain the switch 10 in closed position. This switch will remain closed until the liquid level recedes below the end of the electrode 21 whereupon this circuit will also be broken and the switch 10 will open by gravity since the switch 8 has previously opened under the action of the spring outlined.

Of course, the apparatus for controlling liquid levels illustrated can be modified and changed in various ways without departing from the invention herein set forth and hereafter claimed.

It is further to be understood that inventive features of the apparatus may be used in connection with the elimination of surplus materials of any sort which are electrically conductive by a proper arrangement of the apparatus to fit the given conditions within the spirit and scope of the invention.

I claim:—

1. An installation for controlling the level of electrically conductive liquid within a container, comprising a liquid eductor, electrically responsive means controlling the eductor including a circuit and switch, a second circuit normally open closed by said switch and including spaced electrodes effective at the minimum liquid level, a third circuit including spaced electrodes effective at the maximum liquid level, a fourth circuit including a relay, and means in the third circuit for closing the relay, said fourth circuit also including magnetic means for closing the switch, said magnetic means being included also in said second circuit.

2. An installation for controlling the level of electrically conductive liquid within a container, comprising a liquid eductor, electrically responsive means controlling the eductor including a circuit and switch, a transformer, a second circuit normally open closed by said switch and including spaced electrodes effective at the minimum liquid level, said second circuit being grounded at both terminals and including the secondary of the transformer, a third circuit including spaced electrodes effective at the maximum liquid level, said third circuit being grounded at both terminals and including the secondary of the transformer, a fourth circuit including a relay and the secondary of the transformer, and means in the third circuit for closing the relay, said fourth circuit also including magnetic means for closing the switch, said magnetic means being included also in said second circuit.

In testimony whereof I have signed my name to this specification.

HARRY M. LE FEVER.